US009607726B2

(12) United States Patent
Wu

(10) Patent No.: US 9,607,726 B2
(45) Date of Patent: Mar. 28, 2017

(54) COMPOSITION COMPRISING SILVER NANOWIRES

(71) Applicant: XEROX CORPORATION, Norwalk, CT (US)

(72) Inventor: Yiliang Wu, Oakville (CA)

(73) Assignee: XEROX CORPORATION, Norwalk, CT (US)

( * ) Notice: Subject to any disclaimer, the term of this patent is extended or adjusted under 35 U.S.C. 154(b) by 28 days.

(21) Appl. No.: 14/610,287

(22) Filed: Jan. 30, 2015

(65) Prior Publication Data
US 2016/0225482 A1 Aug. 4, 2016

(51) Int. Cl.
*A01K 1/015* (2006.01)
*H01B 1/22* (2006.01)
*C08K 3/08* (2006.01)
*C08J 5/18* (2006.01)

(52) U.S. Cl.
CPC .............. *H01B 1/22* (2013.01); *C08J 5/18* (2013.01); *C08K 3/08* (2013.01); *C08J 2333/08* (2013.01); *C08J 2367/00* (2013.01); *C08K 2003/0806* (2013.01)

(58) Field of Classification Search
CPC .......... B32B 27/20; B82Y 30/00; B82Y 10/00
USPC ............ 174/253; 257/784; 428/221
See application file for complete search history.

(56) References Cited

U.S. PATENT DOCUMENTS

| | | | | |
|---|---|---|---|---|
| 7,901,596 B2* | 3/2011 | Bailey | ............... | B41M 3/006 252/512 |
| 2006/0257637 A1* | 11/2006 | Pereira | ............... | B82Y 10/00 428/221 |
| 2007/0074316 A1* | 3/2007 | Alden | ............... | B82Y 30/00 257/784 |
| 2008/0044634 A1* | 2/2008 | Enciu | ............... | H05K 3/12 428/209 |
| 2012/0321846 A1* | 12/2012 | Nakamura | ............... | H01B 1/02 428/137 |
| 2012/0321864 A1* | 12/2012 | Lowenthal | ............... | C09D 11/52 428/195.1 |
| 2013/0153829 A1* | 6/2013 | Kondo | ............... | H01B 1/02 252/503 |
| 2014/0008106 A1* | 1/2014 | Wright | ............... | B32B 27/20 174/253 |
| 2014/0054515 A1* | 2/2014 | Lowenthal | ............... | H01B 1/22 252/513 |

OTHER PUBLICATIONS

Sureshkumar, M. et al, "Conductive Nanocomposites Based on Polystyrene Microspheres and Silver Nanowires by Latex Blending," ACS Appl. Mater. Interfaces, 7, pp. 756-764 (2015).*
Riger, J. "The Glass Transition Temperature of Polystyrene," J. Thermal Analysis, 46, 965-972 (1996).*

* cited by examiner

*Primary Examiner* — Khanh Tuan Nguyen
(74) *Attorney, Agent, or Firm* — MH2 Technology Law Group LLP

(57) ABSTRACT

A composition for forming a conductive film. The composition comprises a plurality of nanowires comprising silver; a latex comprising polymer particles; and an aqueous-based carrier.

16 Claims, 10 Drawing Sheets

COMPOSITION COMPRISING SILVER NANOWIRES

DETAILED DESCRIPTION

Field of the Disclosure

The present disclosure is directed to a composition comprising nanowires and a latex polymer for making a transparent conductive film.

Background

Transparent conductors are widely used in many applications, such as touch panel displays, organic LED lighting, organic photovoltaic devices and dye-sensitized solar cells. Today, the most commonly used transparent conductors are transparent conducting oxides, such as indium-tin oxide (ITO). Because of the fragility and lack of flexibility of ITO films, as well as the limited supply of indium and high cost of vacuum processing employed to make the ITO films, alternatives are being actively sought. Such alternatives include silver nanowires, metal mesh, carbon nanotubes, graphene and conductive polymers.

Among the ITO alternatives, carbon nanotube technology requires the separating of metallic tubes from semiconducting tubes; graphene is very difficult to synthesize and usually offers low transparency; and conductive polymers exhibit high sheet resistance. Given the problems with other alternatives, silver nanowire technology may be the most promising approach due to its relatively high conductivity, high transparency, and solution processability. However, current silver nanowire technology suffers from instability in terms of poor film robustness and/or poor adhesion. New formulations to improve the adhesion of silver nanowire on substrates, without trade off of the conductivity and transparency, are urgently needed.

SUMMARY

An embodiment of the present disclosure is directed to a composition for forming a conductive film. The composition comprises: a plurality of nanowires comprising silver; a latex comprising polymer particles; and an aqueous-based carrier.

Another embodiment of the present disclosure is directed to a composition for forming a conductive film. The composition comprises: a plurality of nanowires comprising silver; a latex comprising polymer particles having a glass transition temperature of 150° C. or less; and an aqueous-based carrier. A weight ratio of the nanowires to the polymer particles ranges from about 10:1 to about 1:1.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrates embodiments of the present teachings and together with the description, serve to explain the principles of the present teachings.

Figure 1A:
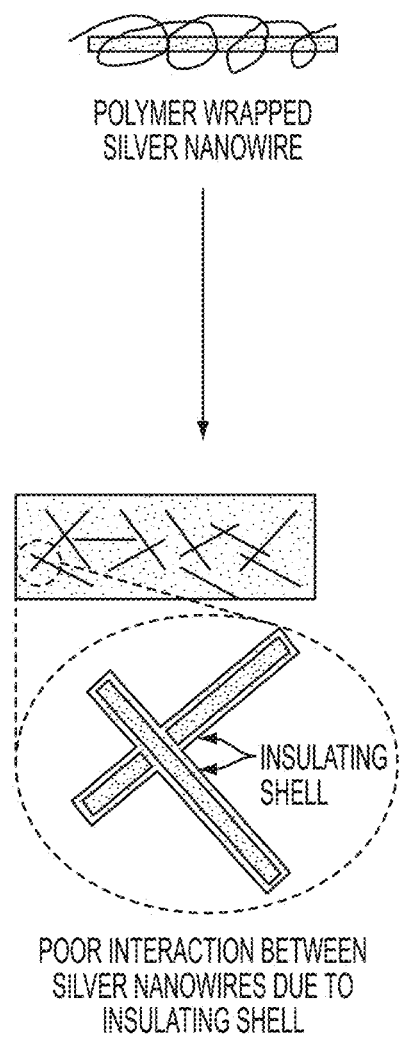
FIG. 1A illustrates the poor interaction between silver nanowires due to an insulating shell that can occur when soluble polymers are employed, according to a comparative example of the present disclosure.

It should be noted that some details of the figure have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. In the drawings, like reference numerals have been used throughout to designate identical elements. In the following description, reference is made to the accompanying drawings that form a part thereof, and in which is shown by way of illustration a specific exemplary embodiment in which the present teachings may be practiced. The following description is, therefore, merely exemplary.

Silver Nanowire and Latex Compositions

An embodiment of the present disclosure is directed to a composition for forming a conductive film. The composition comprises: a plurality of nanowires comprising silver; a latex comprising polymer particles; and an aqueous-based carrier.

Figure 1B:
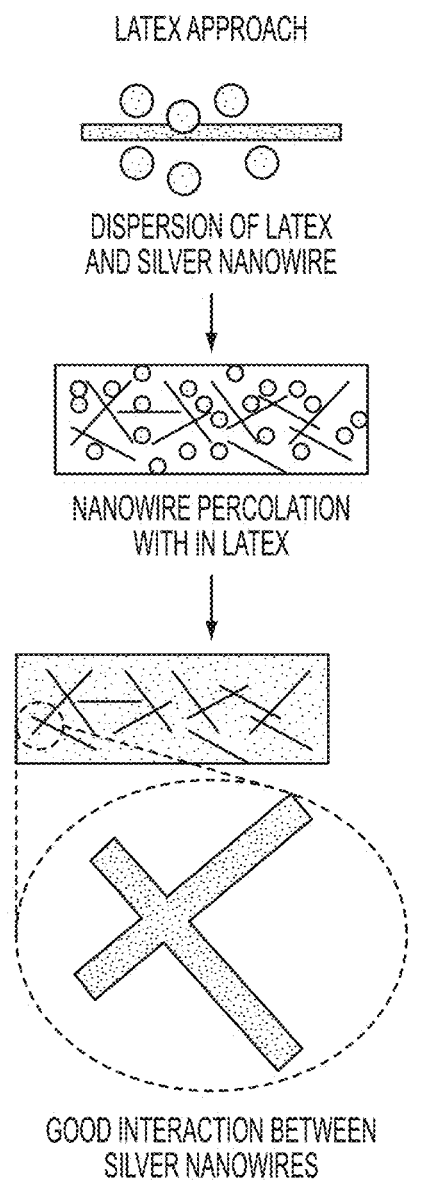
FIG. 1B illustrates good interaction between silver nanowires formed using an aqueous formulation based on silver nanowires and polymer latex, according to an embodiment of the present disclosure.

The use of polymer latex in the silver nanowire films can substantially increase adhesion of the silver nanowires on the substrate surface, thus yielding a robust, transparent, conductive film with excellent solvent resistance. Additionally, employing polymer latex can enable the use of a broader range of polymers compared with soluble polymers. As illustrated in FIG. 1, the use of polymer latex rather than water soluble polymer also can allow better wire to wire contact in the film, and thus result in a lower sheet resistance. This may in part be due to soluble polymers undesirably wrapping around the nanowires and/or otherwise forming a polymeric shell on the nanowires that can reduce electrical contact between the nanowires, as illustrated in FIG. 1A. On the other hand, latex polymers allow the nanowires to disperse and/or percolate within the latex while still allowing electrical contact, and thus improved conductivity, as illustrated, for example, in FIG. 1B.

The polymer particles in the latex can comprise any suitable polymer material capable of forming a transparent polymer film. In an embodiment, the polymer particles have a glass transition temperature of 150° C. or less, such as a glass transition temperature of 120° C. or less, 100° C. or less, or 75° C. or less. For example, the polymer particles can have a glass transition temperature of 25° C. or less, or even 15° C. or less. The low glass transition temperature can allow the particles to fuse together and thereby provide the desired adhesion at relatively low temperatures, after the water or other carrier is removed using a relatively low temperature drying step, without employing additional high temperature heating.

The polymer particles can have any suitable size that will provide the desired composition and coating properties. If the particle size is too large, the composition may not be stable and may undesirably form precipitates. The uniformity of the coating can also undesirably be affected. In an embodiment, the polymer particles have an average particle size of 300 nm or less, such as 200 nm or less.

In an embodiment, the polymer particles comprise a polymer selected from the group consisting of an acrylate polymer, a polyester, a polyurethane, a styrene based copolymer and combinations thereof. In an embodiment, the latex polymer is an acrylate polymer.

In an embodiment, the amount of nanowires in the composition ranges from about 1 mg/mL to about 10 mg/mL, such as about 1 mg/mL to about 5 mg/mL. In an embodiment, a weight ratio of the nanowires to the polymer particles ranges from about 10:1 to about 1:1, such as about 6:1 to about 2:1, or about 9:2 to about 3:1. The weight ratio is a factor in achieving the proper balance between film robustness and conductivity. If too much polymer is used, the adhesion will be greater, which will improve the robustness of the film. However, the conductivity of the film will decrease. Too little polymer can result in good conductivity but poor film robustness.

In an embodiment, an average thickness of the nanowires is about 50 nm or less, such as about 30 nm or less. For example, the average thickness of the nanowires can range from about 50 nm to about 1 nm, or about 40 nm to about 10 nm. In non-cylindrical shaped nanowires, the thickness can be the largest dimension of the nanowire that is perpendicular to the longitudinal axis, such as for example, the diameter, in the case of a cylindrical nanowire. In an embodiment, an average length of the nanowires ranges from about 10 microns to about 100 microns, such as about 30 microns to about 80 microns. If the average thickness of the wire is too great it can reduce transparency and/or decrease conductivity of the film at a given nanowire to polymer weight ratio.

The use of water as the coating media is less toxic and can be considered good for the environment when compared with some other transparent conductive films that may use environmentally unfriendly solvents. This is particularly true for making large area coatings, such as for a coating formulation with over 99 wt % solvent.

The amount of aqueous based carrier employed in the composition can be any desired amount that will provide the desired flow properties for coating. In an embodiment, the amount of water in the compositions can be 95% by weight or more based on the total weight of the coating composition, such as 98% by weight or more. For example the amount of water can range from about 95% to about 99.9% by weight.

The nanowire, latex and carrier ingredients described herein can be mixed together in any desired manner to form the compositions of the present disclosure. The ingredients can be mixed together in any suitable order or all at once. One of ordinary skill in the art would readily be able to formulate the aqueous compositions described herein given the teachings of the present disclosure.

Conductive Silver Nanowire Films

Figure 2:
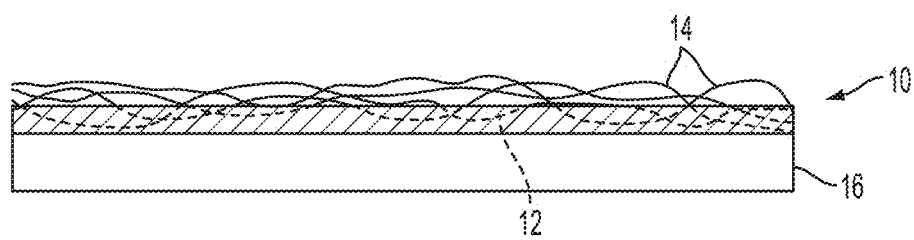
FIG. 2 shows a schematic cross section of a device comprising a silver nanowire film, according to an embodiment of the present disclosure.

The present disclosure is also directed to a transparent, conductive film 10. As shown in FIG. 2, the film 10 comprises a transparent polymer 12 formed from fused latex polymer particles. A plurality of nanowires 14 comprising silver are partially dispersed in the transparent polymer 12. The film 10 includes nanowires that are partially exposed at the surface and partially embedded in the latex polymer. In FIG. 2, the dashed nanowire lines represent the embedded portions of the nanowires 14 and the solid nanowire lines represent the exposed portions. The exposed portions of the nanowires at the surface form a surface morphology that is believed to be different from that of transparent conductive films reported elsewhere in the literature. In embodiments, at least a portion of the silver nanowires are embedded in the fused polymer latex. Most of the nanowires retain excellent wire to wire contacts within the film due to the use of nanometer latex particles that are generally not able to wrap around the individual nanowires having high aspect ratio, as explained above with respect to FIG. 1.

The portion of the nanowires 14 extending from the transparent latex polymer 12 is sufficient to provide wire to wire contact outside the fused latex adhesive layer, thereby resulting in improved conductivity. Based on SEM imaging of the films, the nanowires 14 can have, on average, 10% or more of the length of the nanowires extending outside the latex polymer 12. For example, on average about 20%, or 30%, or 50% or more of the length of the nanowires extend outside the polymer. Thus, a significant length of the nanowires is not fully embedded in the polymer.

The transparent conductive film 10 can have any suitable thickness that will allow for the desired transparency. For example, the thickness can be less than 100 nm, such as less than 50 nm, or less than 20 nm. In an embodiment, the conductive film has a thickness ranging from about 10 nm to about 100 nm.

In an embodiment, the transparent conductive film 10 has a transparency of at least 90%, such as at least 95%, at a radiation wavelength of 550 nm and with a sheet resistance of 500 Ohms/square or less. The transparency was measured using UV spectroscopy.

In an embodiment, the conductive film has a sheet resistance of 500 Ohms/square or less, such as 200 Ohms/square or less, as measured by a 4-point probe method at 25° C. The sheet resistance as measured by the 2-probe method is less than 50 Ohms/square at 25° C.

The conductive films of the present disclosure can exhibit improved robustness. This can allow the films to better maintain the desired conductivity during film processing. For example, cleaning of transparent conductive films is usually carried out prior to integration into final electronic devices. Therefore, good adhesion of the silver nanowire to the substrate provides a significant advantage in providing robust films that can withstand cleaning and still provide the desired electrical properties. As discussed in greater detail below, films made by the methods of the present disclosure can exhibit an increase in sheet resistance of less than 50% after being washed with water or other solvents, such as isopropyl alcohol ("IPA") and acetone solvents, where sheet resistance is measured by a 4-point probe method. The improvement of solvent resistance or adhesion of the nanowires is believed to be due to the use of the polymer latex, which functions as glue or adhesive as described above. For purposes of this disclosure, the percentage increase in sheet resistance is defined as:

Delta SR %=[−(SR1−SR2)/SR1]×100, where:
Delta SR % is percent increase in sheet resistance;
SR1 is sheet resistance prior to washing; and
SR2 is sheet resistance after washing.

The films of the present disclosure can be employed in a variety of devices as transparent, conductive films. Examples of such devices include touch panel displays, organic LED lighting, organic photovoltaic devices and dye-sensitized solar cells. The devices comprise a substrate 16 and a conductive film 10 disposed over the substrate. The substrate can be any substrate on which the film can be applied. The substrate can be either transparent or opaque and can include a variety of electrical, optical or other components (not shown). Suitable substrates are well known in the art.

The conductive transparent film 10 can be made using any of the aqueous compositions comprising silver nanowires and latex as taught herein. The aqueous compositions can be deposited on the substrate 16 using any known coating methods that are suitable for depositing a dispersion composition. Examples include Meyer rod coating, slot die coating and drawdown coating. Following deposition, the aqueous carrier is removed by drying. Drying can be performed in any suitable manner, such as by heating, use of low pressures or both. Fusing of the latex particles can occur during the deposition and/or drying processes. Depending on the glass transition temperature of the latex polymer, relatively low drying temperatures can be employed. For example, drying temperatures can range from 150° C. or less, such as from about 80° C. to about 140° C. or 100° C. to about 130° C. The transparent polymer 14 can be made by fusing any of the latex polymer particles described herein. Once fused, the latex particles form a continuous polymer layer in which the nanowires 14 are embedded.

EXAMPLES

Example 1

Silver Nanowire/Latex Compositions

In the examples below, commercially available silver nanowire from Seashell Technology and Sigma-Aldrich were used. The Seashell silver nanowire has an average thickness around 25 nm, and length from about a few microns to about 60 microns. The Sigma-Aldrich silver nanowire has an average thickness around 125 nm. Various polymer latexes were used in the example formulations to increase the adhesion of the final transparent conductive film, including an adhesive latex based on acrylic acid ester and vinyl acetate copolymer (ACRONAL™, from BASF), acrylic dispersion of a copolymer based on butyl acrylate and methacrylate (PLEXTOL™, from BASF), a crystalline polyester latex, and an amorphous polyester latex. All of the latexes had particle size of 100-200 nm. Transparent conductive films were coated using a Meyer rod at a substrate temperature of 70° C. and then dried at 120° C.

Using the 25 nm silver nanowires obtained from Seashell (sometimes referred to in the following examples as "25 nm silver nanowire"), the concentration of the silver nanowire employed in the example formulations was selected by varying the amount in the formulation from 5 mg/mL to 1.0 mg/mL. Transparent conductive films with the differing amounts of nanowires were prepared, the sheet resistance was characterized using the 4-point probe method, and the transparency was evaluated using UV-Vis spectroscopy. It was found that a concentration of 2.5 mg/mL of silver nanowires yielded the preferred transparency (>90%) and acceptable sheet resistance.

The coating temperature was chosen for the examples by depositing a number of films at different substrate temperatures ranging from 40° to 100° C. It was found that a good coating temperature ranges from about 60° to about 80° C. for the aqueous formulations of these examples, such as about 70° C.

The weight ratio of 25 nm silver nanowire to polymer latex was studied from about 6:1 to about 1:1. A weight ratio of about 3.8:1 was found to provide low resistivity while still providing good adhesion of the nanowires to the substrate.

Example mixtures of the 25 nm silver nanowire were made with each of the ACRONAL, PLEXTOL, crystalline polyester and amorphous polyester latexes. For all examples, the silver nanowire concentration was kept at 2.5 mg/ml, and the silver nanowire to polymer ratio was kept at 3.8:1. Transparent conductive films were coated using Meyer rod on PET substrates at the substrate temperature of 70° C. and dried at 120° C. for 5-10 min. The results of the experiments are discussed below.

Table 1 summarizes the polymer latex used in the examples and the corresponding sheet resistance and transparency of the films. In all cases, the transparency was higher than 90%, and the sheet resistance was less than the control sample ITO glass. It should be noted that other polymer latex can be used as the additives (adhesion promoter) as well.

TABLE 1

| Latex | Key Features of Latex | Sheet Resistance* (ohms/sq) | Transparency at 550 nm (%) |
|---|---|---|---|
| ACRONAL | Acrylic acid ester and vinyl acetate copolymer (Tg, −13° C.) | 154 | 92 |
| PLEXTOL | Copolymer of butyl acrylate and methacrylate (Tg, ~9° C.) | 304 | 95 |
| Crystalline polyester Latex | Crystalline polyester (Melting point ~60° C.) | 519 | 98 |
| Amorphous polyester Latex | Amorphous polyester (Tg, ~70° C.) | 462 | 98 |
| ITO glass | | 567 | 97 |

*4-point probe method

Example 2

As control experiments, the following comparative formulations were made: a) 25 nm silver nanowire films without polymer latex; b) 25 nm silver nanowire compositions made with a water soluble poly(vinyl alcohol) polymer instead of a latex; and c) 25 nm silver nanowire compositions made with fluorinated polymer latex having a very high melting temperature. The comparative example compositions were made by mixing the 25 nm silver nanowires with either the poly(vinyl alcohol) or the fluorinated polymer latex.

For all the compositions of Example 2A, 2B and 2C below, the same concentrations and coating processes as used in Example 1 were employed, including a silver nanowire concentration of 2.5 mg/ml and a silver nanowire to polymer ratio of 3.8:1. Transparent conductive films were made by coating the example compositions using Meyer rod on PET substrates at the substrate temperature of 70° C. and dried at 120° C. for 5-10 min.

Example 2A

High Tg Fluorinated Polymer Latex Verses Low Tg Latexes

Figure 3:
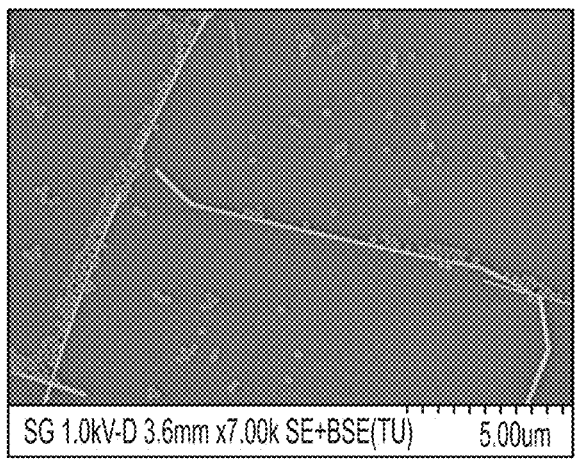
FIG. 3 shows an SEM image of silver nanowire and fluorinated polymer latex, according to an example of the present disclosure.

As a first control experiment, the fluorinated polymer latex was used together with silver nanowire to prove the concept that polymer latex can associate with nanowires at certain positions while allowing good wire to wire contact. FIG. 3 shows SEM of a coated film of this formulation. One can see that clean wires connected to each other with the latex particles attaching to the wires. However, due to the high melting temperature of the fluorinated polymer latex, the latex particles could not be fused together on a Polyethylene terephthalate ("PET") substrate. Therefore, the silver nanowires had poor adhesion on PET. Washing with distilled water caused dramatic increase of sheet resistance, indicating some of the silver nanowires were washed away.

Figure 4A:
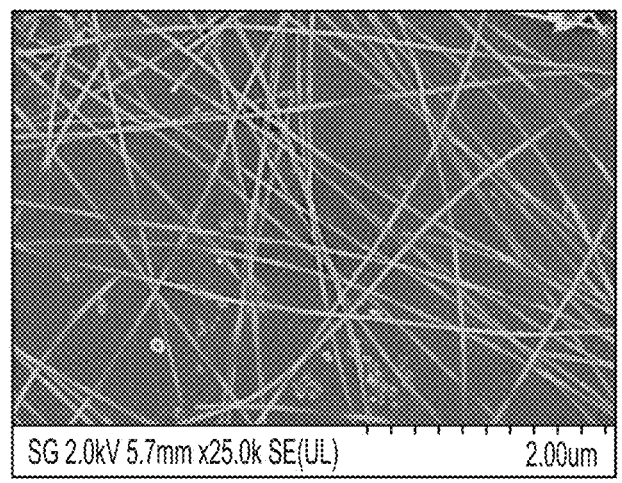
FIG. 4A shows an SEM image of silver nanowires in ACRONAL latex, according to an example of the present disclosure.
Figure 4B:
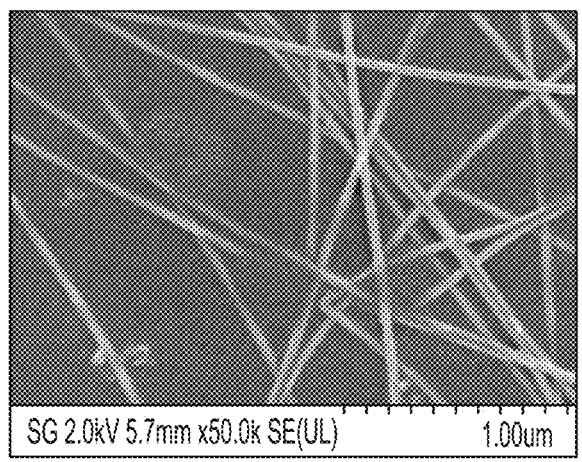
FIG. 4B shows an SEM image of silver nanowires in ACRONAL latex at higher magnification than the FIG. 4A image, according to an example of the present disclosure.
Figure 5:
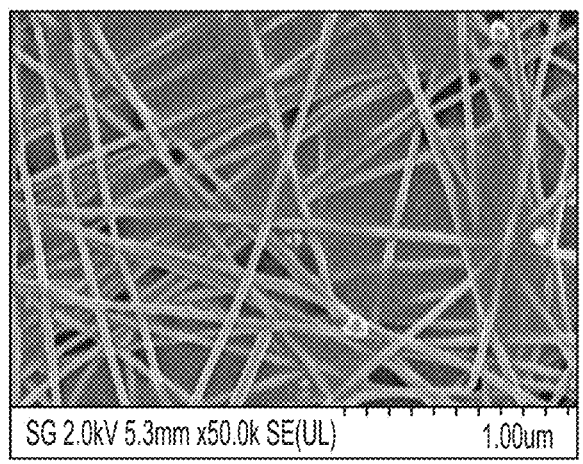
FIG. 5 shows an SEM image of silver nanowires in PLEXTOL latex, according to an example of the present disclosure.

The fluoriated polymer latex was then compared with adhesive latex (ACRONAL), which has a low glass transition temperature (Tg) of about −13° C. In a second formulation, the fluoriated polymer latex was replaced with adhesive latex (PLEXTOL), which has a low glass transition temperature (Tg) of about 9° C. For polymer latex with such low Tg as the ACRONAL and PLEXTOL, the latex can fuse together after coating and drying at 120° C. FIGS. 4A and 4B show an SEM image of a transparent conductive film with ACRONAL additive. FIG. 5 shows an SEM image of a transparent conductive film with PLEXTOL additive. For both latex types, no individual latex particle could be seen as the particles fused together. For some of the silver nanowires, a part of the wire was embedded in the fused polymer latex. However, good wire to wire contacts was maintained. The fused latex functioned as "glue" to bond the wires together, and onto the substrate.

For the film with ACRONAL additive, the sheet resistance was measured using a 4-probe method to be 154 ohms/sq with transparency of 92% at 550 nm. The values are similar to the transparent conductive film without polymer latex, indicating that the addition of polymer latex has little to no effect on the conductivity and transparency. When measured using a 2-probe method with 2 conductive silver strips, the sheet resistance was as low as 32 ohms/sq.

Table 2 summarize the sheet resistance of transparent conductive film made with ACRONAL with 5 different ratios of silver nanowires (shown in Table 2 as Samples 1 to 5). The silver nanowire to polymer latex weight ratio was varied from about 5.82:1 to about 0.4:1. One can see that low sheet resistance comparable with pure silver nanowires could be obtained at a ratio from about 5.8:1 to about 3.8:1. Comparable and better sheet resistance to ITO glass could be obtained at a ratio from about 5.8:1 to about 1:1. In all cases, the sheet resistance is better than a commercial silver nanowire conductive film (obtained from the Seashell Company), on which no conductivity could be detected using the 4-point probe method.

TABLE 2

Sheet resistance of different compositions.

| Samples | Silver nanowire to ACRONAL Weight Ratio | Sheet Resistance* (ohms/sq) |
| --- | --- | --- |
| 1 | 5.82:1 | 154 |
| 2 | 3.78:1 | 167 |
| 3 | 2.54:1 | 263 |
| 4 | 0.97:1 | 413 |
| 5 | 0.4:1 | 12185 |
| Silver nanowire only | / | 154 |
| ITO glass | / | 567 |
| Commercial silver nanowire conductive film obtained from Seashell Company | / | Not detectable |

*4-point probe method

Example 2B

Water Soluble Polyvinyl Alcohol Verses Low Tg Latexes

Figure 6:
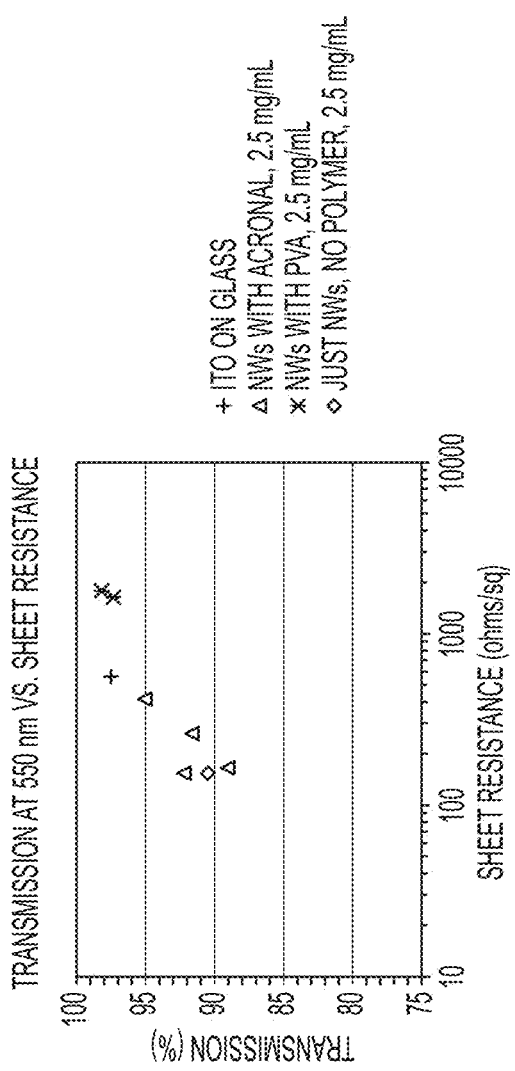
FIG. 6 shows a graph of transparency at 550 nm versus sheet resistance of the transparent conductive film with or without different polymer additives, as discussed in the examples of the present disclosure.

As another control experiment, water soluble polyvinyl alcohol ("PVA") polymer was used together with silver nanowire to create a transparent conductive film. FIG. 6 shows the transparency at 550 nm (as measured with UV-Vis spectroscopy) vs. sheet resistance of transparent conductive films made using PVA, transparent conductive films made using ACRONAL, films of nanowire ("NW") without polymer, and an Indium Tin Oxide film (ITO).

When no polymer additive was used, the nanowire film showed a sheet resistance of about 150 ohms/sq with transparency of about 90%. Addition of ACRONAL latex did not substantially change the sheet resistance and the transparency. However, when PVA was used, the sheet resistance increased 10 times to 1630 ohms/sq. This provided evidence of the correctness of the design principle illustrated in FIGS. 1A and 1B that the soluble polymer may wrap around the silver nanowires and cause poor wire to wire contact, resulting in high sheet resistance. When latex is used good wire to wire contact remains, as the latex particle does not wrap around the wire, thus resulting in similar sheet resistance to the nanowire film without polymer additive.

Example 2C

Robustness Testing

Figure 7:
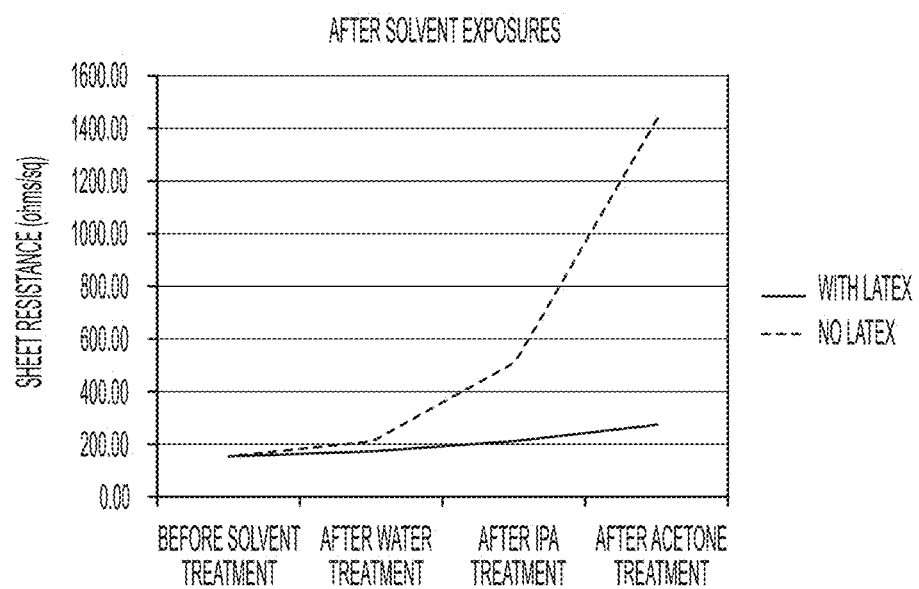
FIG. 7 shows a comparison of sheet resistance of silver nanowire transparent conductive films with and without the polymer latex, upon washing with different solvents, as discussed in the examples of the present disclosure.

To compare robustness (adhesion), transparent conductive silver nanowire films with ACRONAL latex and without latex were washed with common cleaning solvents such as distilled water, isopropyl alcohol (IPA), and acetone. FIG. 7 shows the sheet resistance before and after washing with different solvents. The results clearly showed that silver nanowires have poor adhesion on the substrate if no polymer latex was used in the formulation, as the sheet resistance increased by an order of magnitude where no polymer latex was employed. On the other hand, when the polymer latex was used, the silver nanowires showed significantly improved adhesion and the sheet resistance increased only slightly.

Example 3

Transparency

Transparent conductive films were made using the methods of the present disclosure and placed on top of a Xerox logo printed on a substrate. The logo was clearly visible through the conductive film. Uniform film with B5 to A4 sizes can be achieved using the Meyer rod method in lab conditions. It is anticipated that the coating conditions and method can be further optimized for large area coating.

Example 4

Wire Thickness

Figure 8:
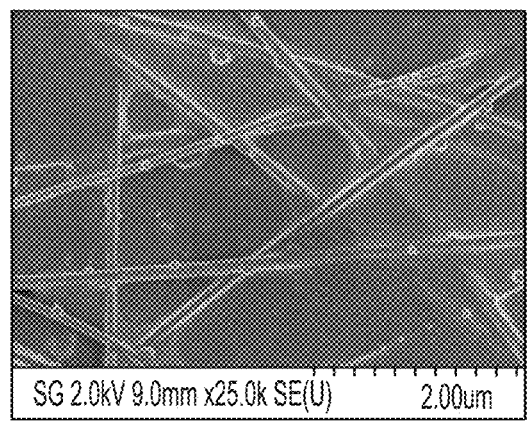
FIG. 8 shows an SEM image of thicker silver nanowires (125 nm) with fused polymer latex.

As another control experiment, the use of silver nanowire with a thickness of 125 nm, obtained from Sigma Aldrich, was investigated. Similar to the above examples, the silver nanowire concentration was 2.5 mg/ml and a 3.8:1 weight ratio of silver nanowires to latex polymer was employed. FIG. 8 shows the SEM image of the film. Although the same morphology of embedded nanowires in a fused polymer latex was observed, the film showed high sheet resistance over 600 ohms/sq. The result indicated that thinner wire is preferred for transparent conductive film.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A composition for forming a conductive film, the composition comprising:
    a plurality of nanowires comprising silver;
    a latex comprising polymer particles having a glass transition temperature of 25° C. or less; and
    an aqueous-based carrier,
    wherein a weight ratio of the nanowires to the polymer particles ranges from about 6:1 to about 2:1.

2. The composition of claim 1, wherein the polymer particles have an average particle size of 300 nm or less.

3. The composition of claim 1, wherein the polymer particles comprise a polymer selected from the group consisting of an acrylate polymer, a polyester, a polyurethane and combinations thereof.

4. The composition of claim 1, wherein the polymer particles comprise an acrylate polymer.

5. The composition of claim 1, wherein the amount of nanowires in the composition ranges from about 1 mg/mL to about 10 mg/mL.

6. The composition of claim 1, wherein an average thickness of the nanowires is about 50 nm or less.

7. The composition of claim 6, wherein an average length of the nanowires ranges from about 10 microns to about 100 microns.

8. The composition of claim 1, wherein the latex particles are fusable together so as to form a continuous polymer layer in which the nanowires are embedded if the composition is dried at temperatures of 150° C. or less.

9. A composition for forming a conductive film, the composition comprising:
    a plurality of nanowires comprising silver;
    a latex comprising polymer particles having a glass transition temperature of 25° C. or less; and
    an aqueous-based carrier,
    wherein a weight ratio of the nanowires to the polymer particles ranges from about 10:1 to about 2:1.

10. The composition of claim 9, wherein the polymer particles have an average particle size of 300 nm or less.

11. The composition of claim 9, wherein the polymer particles comprise a polymer selected from the group consisting of an acrylate polymer, a polyester, a polyurethane and combinations thereof.

12. The composition of claim 9, wherein the polymer particles comprise an acrylate polymer.

13. The composition of claim 9, wherein the amount of nanowires in the composition ranges from about 1 mg/mL to about 10 mg/mL.

14. The composition of claim 9, wherein a weight ratio of the nanowires to the polymer particles ranges from about 6:1 to about 2:1.

15. The composition of claim 9, wherein an average thickness of the nanowires is about 50 nm or less.

16. The composition of claim 15, wherein an average length of the nanowires ranges from about 10 microns to about 100 microns.

* * * * *